US007447755B1

(12) United States Patent
Maxted et al.

(10) Patent No.: US 7,447,755 B1
(45) Date of Patent: Nov. 4, 2008

(54) METHOD AND APPARATUS FOR POLICY MANAGEMENT IN A NETWORK DEVICE

(75) Inventors: Mark Maxted, Waterloo (CA); Matthew Thurston, Guelph (CA); Kevin Porter, Guelph (CA); Chris Zuercher, Waterloo (CA); Doug Moen, Waterloo (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 666 days.

(21) Appl. No.: 10/100,837

(22) Filed: Mar. 18, 2002

(51) Int. Cl.
*G06F 15/173* (2006.01)
(52) U.S. Cl. .................................................. 709/223
(58) Field of Classification Search ................ 709/228, 709/220–222, 223–225, 230–237, 203
See application file for complete search history.

(56) References Cited

U.S. PATENT DOCUMENTS

| | | | | | |
|---|---|---|---|---|---|
| 5,751,967 | A | * | 5/1998 | Raab et al. | 709/228 |
| 5,918,017 | A | * | 6/1999 | Attanasio et al. | 709/224 |
| 6,097,882 | A | * | 8/2000 | Mogul | 709/201 |
| 6,219,706 | B1 | * | 4/2001 | Fan et al. | 709/225 |
| 6,381,639 | B1 | * | 4/2002 | Thebaut et al. | 709/222 |
| 6,466,984 | B1 | * | 10/2002 | Naveh et al. | 709/228 |
| 6,496,866 | B2 | * | 12/2002 | Attanasio et al. | 709/239 |
| 6,539,425 | B1 | * | 3/2003 | Stevens et al. | 709/220 |
| 6,728,748 | B1 | * | 4/2004 | Mangipudi et al. | 718/105 |
| 6,763,370 | B1 | * | 7/2004 | Schmeidler et al. | 709/203 |
| 6,804,722 | B1 | * | 10/2004 | Nishi | 709/234 |
| 7,124,188 | B2 | * | 10/2006 | Mangipudi et al. | 709/226 |
| 2003/0115354 | A1 | * | 6/2003 | Schmidt et al. | 709/232 |
| 2006/0253599 | A1 | * | 11/2006 | Monteiro et al. | 709/230 |

OTHER PUBLICATIONS

Heiler et al., Policy Driven Configuration Management of Network Device, Network Operations and Management Symposium, 1996, IEEE, vol. 3, Apr. 15-19, 1996, pp. 674-689.*

Moore et al., Policy Core Information Model—Version 1 Specification, <http://www.ietf.org/rfc/rfc3060.txt>, p. 1-94, The Internet Society, Feb. 2001.

(Continued)

*Primary Examiner*—Jason Cardone
*Assistant Examiner*—Thomas Duong
(74) *Attorney, Agent, or Firm*—Sonnenschein, Nath & Rosenthal LLP

(57) ABSTRACT

A method and apparatus for policy management in a network intermediary device. One embodiment of the invention, includes establishing a session between a client and an intermediary device on a network to enable processing of a communication between the client and the intermediary device. Then, the communication is processed by the intermediary device while maintaining a consistent version of policy throughout the communication. Finally, after the communication is complete, the intermediary terminates the communication. The intermediary device may maintain consistent policy by utilizing a policy ticket upon which transactional information is stored and that references the version of policy that was current when the communication first began. The policy ticket may be transported throughout the intermediary device according to a "checkpoint" scheme, and at each checkpoint, evaluating the policy rules, if necessary, to determine appropriate actions to be taken based on current client and network information as applied to the policy rules.

11 Claims, 12 Drawing Sheets

OTHER PUBLICATIONS

Westerninen et al., Terminology for Policy-Based Management, <http://www.ietf.org/rfc/rfc3198>, p. 1-20, The Internet Society, Nov. 2001.

Rafalow et al., Policy Requirements for Edge Services, <http://search.ietf.org/internet-drafts/draft-rafalow-opes-policy-requirements-00.txt>, p. 1-14, The Internet Society, Jul. 2001.

Tomlinson et al., A Model for Open Pluggable Edge Services, <http://search.ietf.org/internet-drafts/draft-tomlinson-opes-model-01.txt>, p. 1-31, The Internet Society, Nov. 2001.

Snir et al., Policy QoS Information Model, <http://www.ietf.org/internet-drafts/draft-ietf-policy-qos-info-model-04.txt>, p. 1-66, The Internet Society, Nov. 2001.

* cited by examiner

METHOD AND APPARATUS FOR POLICY MANAGEMENT IN A NETWORK DEVICE

FIELD OF THE INVENTION

An embodiment of the invention relates generally to network communications and, more specifically, to policy management in a network device.

BACKGROUND OF THE INVENTION

Typically, in a computer network, when a client requests content from a server, the request is sent to the server through a number of intermediary devices, each of which may alter the request in some way, according to rules installed on the intermediary device. The intent of these rules, and their embodiment, are commonly known as policy.

Management of the typical request/response process, however, is often complicated by a number of factors. First, there are a number of hardware and software computing elements involved, each of which is affected by policy, thus adding complexity to the management of the process.

Second, information required for policy decisions arrives at different times. For example connection information, request information and response information form three discrete "bundles" of information that become available at different times and within different processing subsystems. Thus the typical process is difficult to manage from a timing standpoint.

Finally, the typical process is often extended in time, during which the policy rules may change, thus increasing the possibility of conflicting policy versions.

These factors, and others, add unpredictability to the typical process. Therefore, arbitrary changes to in-progress traffic, either by the client, by the intermediary device, or by other network devices, may possibly result in unexpected results to the client or to the network. Unexpected results may lead to relatively benign problems, such as causing irritation to the network user, or may lead to quite serious problems, such as causing security breaches in the network.

Therefore, there is a need for a mechanism to allow for the uniform application of policy across separate processing elements within an intermediary device.

BRIEF DESCRIPTION OF THE DRAWINGS

The present invention is illustrated by way of example and not limited by the figures of the accompanying drawings in which like references indicate similar elements and in which.

SUMMARY OF THE INVENTION

Figure 1:
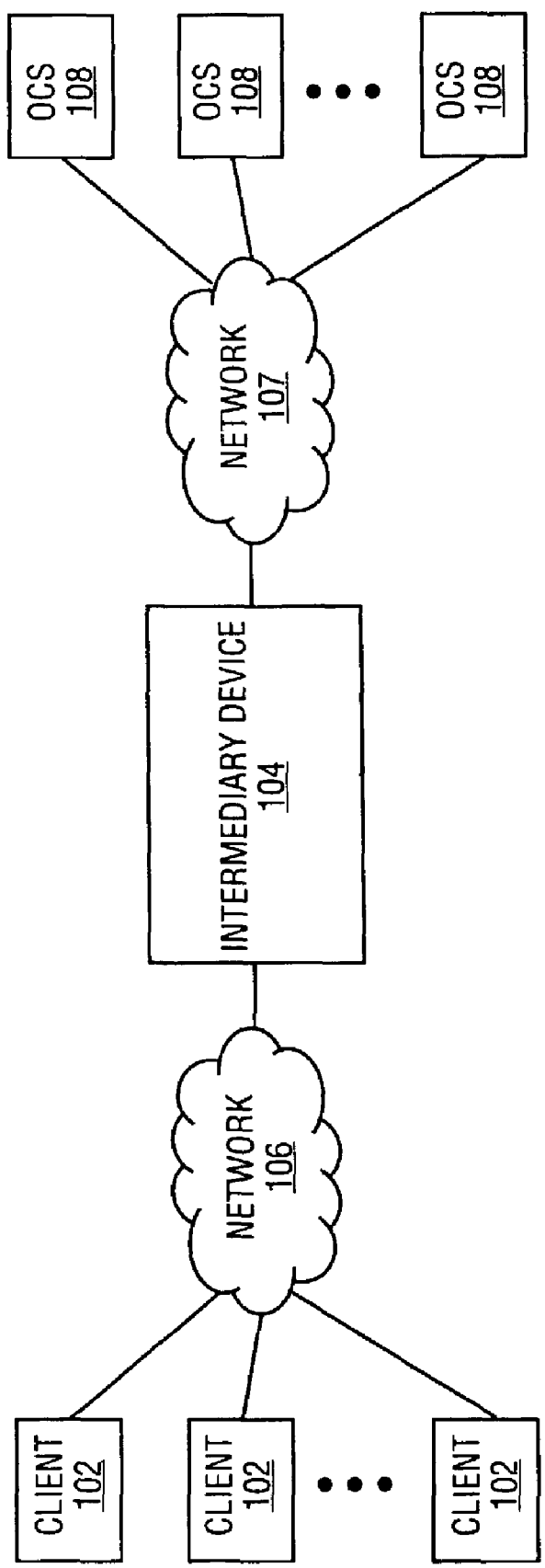
FIG. 1 is a block diagram of one embodiment of a network system 100 utilizing an intermediary device.

A method and apparatus for policy management in a network device is described. One embodiment of the invention includes establishing a session between a client and an intermediary device on a network to enable processing of a communication between the client and the intermediary device. Then, the communication is processed by the intermediary device while maintaining a consistent version of policy throughout the communication. Finally, after the communication is complete, the intermediary terminates the communication.

In one embodiment of the invention, the intermediary device maintains consistent policy by utilizing a policy ticket upon which transactional information is stored and that references the version of policy that was current when the communication first began. The policy ticket is transported throughout the intermediary device according to a "checkpoint" scheme, each checkpoint representing an occasion in the communication at which policy rules may need to be evaluated, or re-evaluated. At each checkpoint, the policy ticket is delivered to a policy evaluator to determine if policy rules need to be evaluated, and, if so, then evaluating the policy rules to determine appropriate actions to be taken at the current checkpoint, and in subsequent checkpoints, based on current client and network information as applied to the policy rules.

DETAILED DESCRIPTION OF THE INVENTION

Described herein is a method and apparatus for policy management in a network device on a computer network. In the following description numerous specific details are set forth. One of ordinary skill in the art, however, will appreciate that these specific details are not necessary to practice the present invention. While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

DEFINITIONS

Herein, the terms "request", "client request", "requested object", or "object" may be used interchangeably to mean action(s), object(s), and/or information requested by a client from a network device, such as an intermediary or a server. In addition, the terms "response" or "server response" may be used interchangeably to mean corresponding action(s), object(s) and/or information returned from the network device. Furthermore, the terms "communication" and "client communication" may be used interchangeably to mean the overall process of a client making a request and the network device responding to the request.

Architecture

FIG. 1 is a block diagram of one embodiment of a network system 100 utilizing a network device, such as an intermediary device. It comprises any one of a plurality of client devices 102 connected to an intermediary device 104 via a network 106. A client device 102 ("client") is a computing device capable of making a request (e.g., for an object, service, etc.) over the network 106 and receiving a response for the request.

For instance, the client 102 may be a personal computer (PC), a hand-held device or personal digital assistant (PDA) type device, a cell-phone, etc. In one embodiment, the client is a PC running a web browser application and may make requests for objects over the network 106 by utilizing the web browser.

The intermediary device 104 is a computing device capable of receiving and responding to the request made by the client 102. In one embodiment, the intermediary device 104 is a web accelerator, with an internal object store housing objects that may be requested by the client 102.

The networks 106 and 107 may be distinctly separate networks or the same network and may be any kind of networks known in the art. For instance, networks 106 and 107 may be private networks, such as intranets, extranets, local area networks (LANs), or wireless networks. The networks 106 and 107 may also be public networks, such as the Internet. Additionally, networks 106 and 107 may be a combination of private and public networks. Furthermore, many computer devices may have multiple network cards and, thus, networks 106 and 107 may contain multiple upstream or downstream networks. Nevertheless, in the interest of brevity, networks 106 and 107 will hereafter be referred to by the general term "network" to mean any kind of medium over which the client 102 and the intermediary device 104 communicate.

System 100 may further comprise a plurality of servers 108 that provide content to the intermediary device 104. The purpose of the plurality of servers 108 is to provide a requested object to the intermediary device 104 when the intermediary device 104 does not have the object in its object store. The intermediary device 104 has the ability to query any one of the plurality of servers 108 for the object. Servers 108 are computer devices that can receive the query and respond in kind with the requested object.

Figure 2:
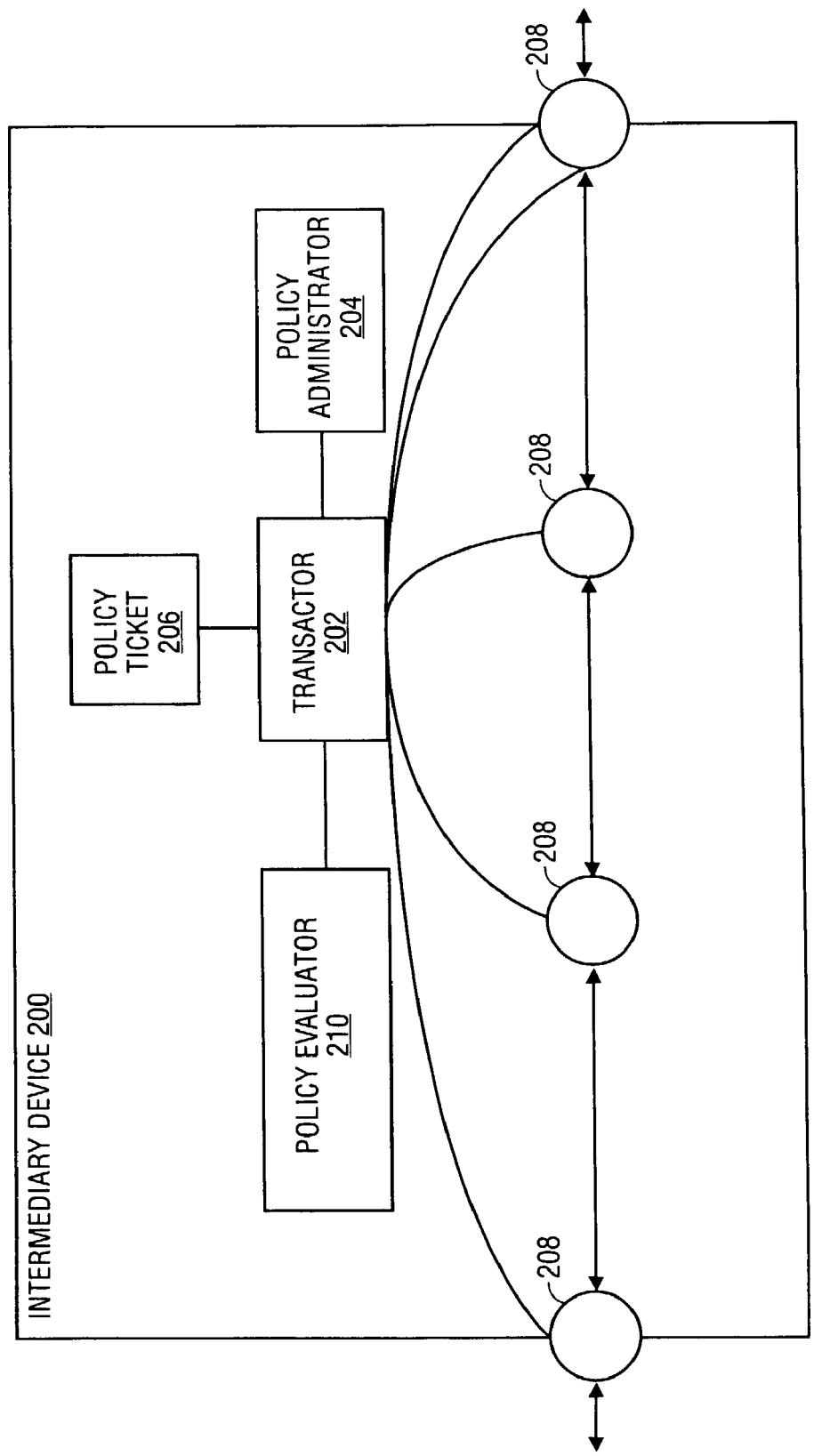
FIG. 2 is a block diagram of one embodiment of an intermediary device, according to the present invention.

FIG. 2 is a block diagram of one embodiment of the intermediary device 104, according to the present invention. Referring to FIG. 2, the intermediary device 200 comprises a transactor 202, a policy administrator 204, a policy ticket 206, a plurality of checkpoints 208, and a policy evaluator 210.

The transactor 202 is to establish a connection at the beginning of a client/intermediary communication ("client communication"), facilitate the progress of the request and response throughout the client communication, and close the connection at the end of the client communication. A transactor 202 may be protocol specific to facilitate requests made for different protocols. Hence, in one embodiment, the transactor 202 is any one of a plurality of protocol agents well known in the art.

The policy administrator 204 is to maintain the current version of policy and assign to the policy ticket 206 the most current version of policy available at the time the client communication begins.

The policy ticket 206 has stored thereon information, such as actions and properties, according to one version of policy, which may be enforced during the client communication. The policy ticket 206 is transported throughout the client request's path through the intermediary device 200. The policy ticket 206 acts as a consultant, or a reference, to the version of policy that was current when the client communication first began.

The path of the client communication is defined by the plurality of checkpoints 208, which are points in the communication where policy rules may need to be evaluated, or reevaluated, based on new information obtained or new events that have occurred ("new information"), during the client communication. At any, or all, checkpoints 208, the transactor 202 is to deliver the policy ticket 206 to the policy evaluator 210 so that the policy evaluator 210 may determine if the new information merits a reevaluation of policy, and, if so, then the policy evaluator 210 can reevaluate policy based on the new information and determine appropriate actions or properties that will need to be subsequently executed or referenced. The policy evaluator 210 may also perform other operations to the policy ticket 206 in anticipation of evaluation at other, future checkpoints. Other operations may include, executing the appropriate actions if possible, or storing on the policy ticket the appropriate actions to be subsequently executed by the transactor 202. Yet other operations may include maintaining the evaluation state for the current checkpoint and marking the policy ticket for future evaluation points. In one embodiment of the invention, these operations are further described in more detail in conjunction with FIG. 7 below.

Figure 3:
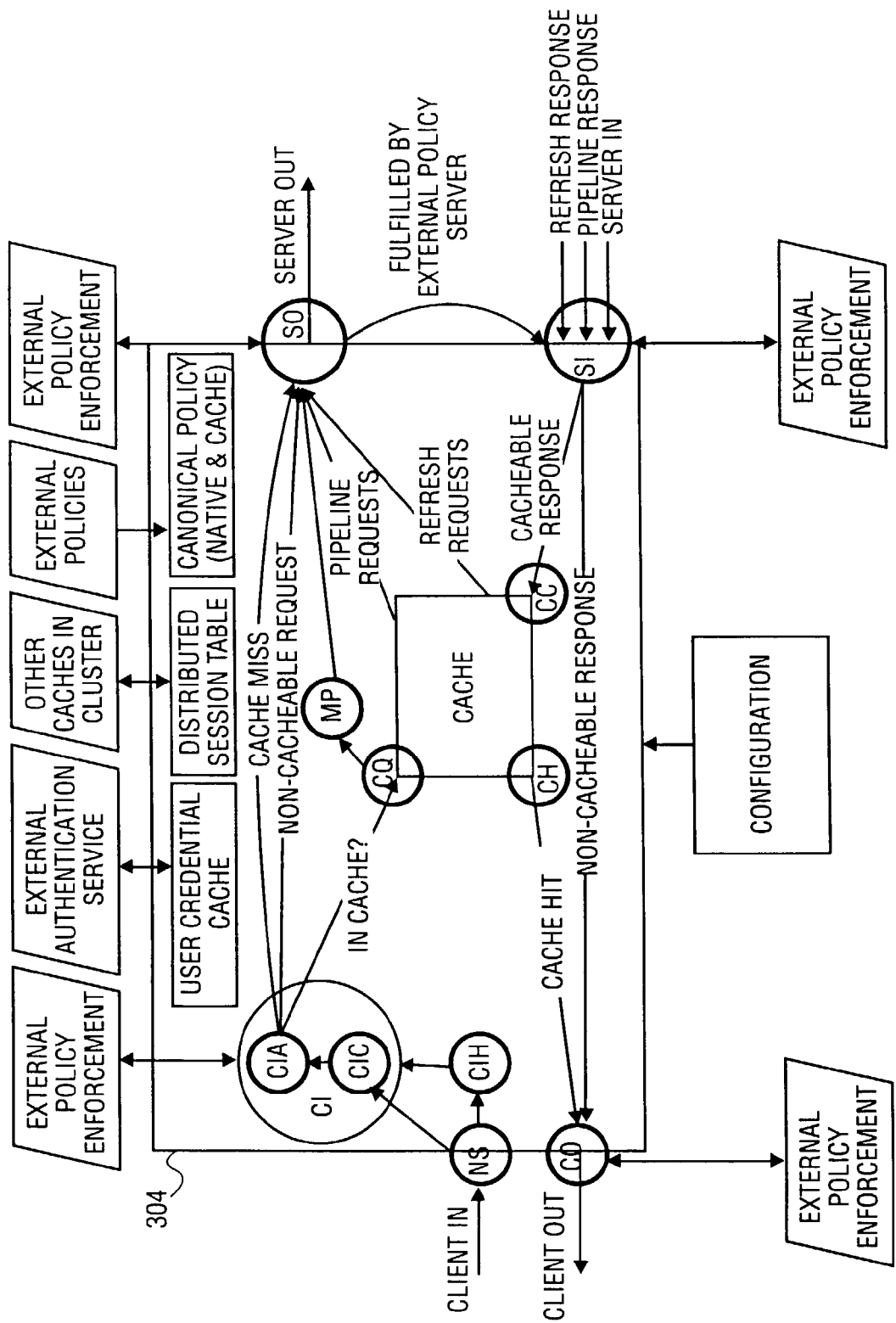
FIG. 3 is a diagram of an exemplary system architecture showing various checkpoints in relation to the processing of a client request within a network intermediary device.

FIG. 3 is a diagram of an exemplary system architecture showing various checkpoints in relation to the processing of a client request within a network intermediary device 304. The following list explains some checkpoints that the client request may encounter during its progression through the intermediary device 304 (progression shown as arrows in FIG. 3):

| | |
|---|---|
| New Session (NS) | This checkpoint is encountered when a new session is established between the client and the intermediary. At this checkpoint, the only information available may include the service type being requested, the client source IP address, the destination IP address and the port. |
| Client-In-Hostname (CIH) | This checkpoint is used by protocols in which only the host name is available before a connection must be established to an origin content server (OCS). The path portion of the URL becomes available after the intermediary establishes the connection to the OCS. This becomes an important timing issue, especially with respect to policy driven authentication. |
| Client In (CI) | This checkpoint is encountered after the client request has been identified but before any attempts have been made to respond to (i.e., fulfill any portion of) the request. |
|     Client-In-Challenge (CIC) | This checkpoint is encountered when the intermediary must determine whether authentication of the request is required for further evaluation of policy. This can entail an authentication challenge between this checkpoint and the CIA checkpoint. |
|     Client-In-Authorize (CIA) | This checkpoint is encountered after the request has been authenticated, according to the requirements determined in CIC, and after any required challenge has been issued and responded to. |
| Cache Query (CQ) | This checkpoint occurs when the cache is about to be queried to determine the availability of a requested object. |
| Media Play (MP) | This checkpoint occurs only when streaming media protocols are requested. It occurs after a cache query and after first contact has been made with a streaming media OCS. Streaming media protocols may need evaluation at this checkpoint for each request on the control channel to modify the media data stream. |
| Cache Hit (CH) | This checkpoint occurs after a response has been obtained from the cache. |
| Server Out (SO) | This checkpoint occurs if the OCS is required to fulfill the request. |
| Server In (SI) | This checkpoint occurs after the response has been received back from an OCS. |
| Cache Charge (CC) | This checkpoint occurs after a response has been received from the OCS, and is cacheable. |
| Client Out (CO) | This checkpoint occurs after a response to a request is ready and is about to be sent back to the client. |

Checkpoints are flexible and can be tailored to the requirements of specific protocols and authentication standards as necessary. For instance, as shown in FIG. 3, the Client-In (CI) checkpoint, which occurs generally when a client needs to be authenticated, can be divided into two distinct checkpoints, the Client-In-Challenge (CIC) and the Client-In-Authorize (CIA) checkpoints. The two distinct checkpoints are necessary because the policy evaluator must first evaluate policy to determine the authentication (e.g. authentication realm, authentication challenge type). The policy evaluator determines the authentication authority and challenge type, and then leaves it up to the transactor to actually do the challenge and collect the credentials. These credentials are then added to a user object associated with the transaction (see FIG. 10). At this stage they are marked as "not verified". Then, this transaction is passed again to the CI checkpoint. The policy evaluator notes that authentication is required, and that credentials are present but not verified, and the policy evaluator then validates the credentials with the appropriate authentication authority (mediated by an on-box credential cache). If the policy says that authentication is required for this transaction, only when the user's credentials have been verified will processing proceed to CIA. So, evaluation at CIC, determines the authentication requirement (i.e., figure out if necessary to know who the user is, what proof of identity is required, and whom to trust to provide that information). At CIA, once the user is user identified, evaluation determines what the user is then allowed to do (i.e., authorization).

Other scenarios would utilize the other checkpoints. For instance, after the client authentication checkpoints, the next checkpoint encountered may be the Cache-Query checkpoint (CQ) to determine the availability of a requested object in the intermediary. If available, then the Cache-Hit (CH) checkpoint would then be encountered. If not available, then the Server Out (SO), Server In (SI), and Cache Charge (CC) checkpoints may be encountered.

As a request proceeds from checkpoint to checkpoint, new information becomes available about the request. For example, for an HTTP protocol, between NS and CI the actual identity of the object can be ascertained when the URL is actually delivered to the intermediary device. At the same time, each checkpoint represents an opportunity to enforce particular types of policy decisions. For example, one policy decision may include the decision to bypass the intermediary cache and always retrieve an object from its OCS regardless of whether the object is available in the intermediary device. Such a decision must be implemented prior to the CQ checkpoint. Thus policy inputs ("conditions") become available no earlier that at specific points in the request flow particular to the type of information represented by the condition. Similarly, policy outputs ("actions" and "properties") must be applied prior to specific points particular to the type of property or action. These timing considerations restrict the possible flexibility of a policy specification. It is the responsibility of a policy compiler to detect violations of these constraints when policy is being installed, and to take appropriate action. Normally this will involve warning the user of the violation and preventing the installation of self-contradictory policy on the intermediary device.

Intermediary device 304 may include other devices, such as a user credential cache, a distributed session table, a canonical policy cache, an object cache, a policy evaluation cache, and a configuration module.

Several methods are described below that further explain the processing that occurs throughout the client communication according to several embodiments of the present invention.

Methodology

Figure 4:
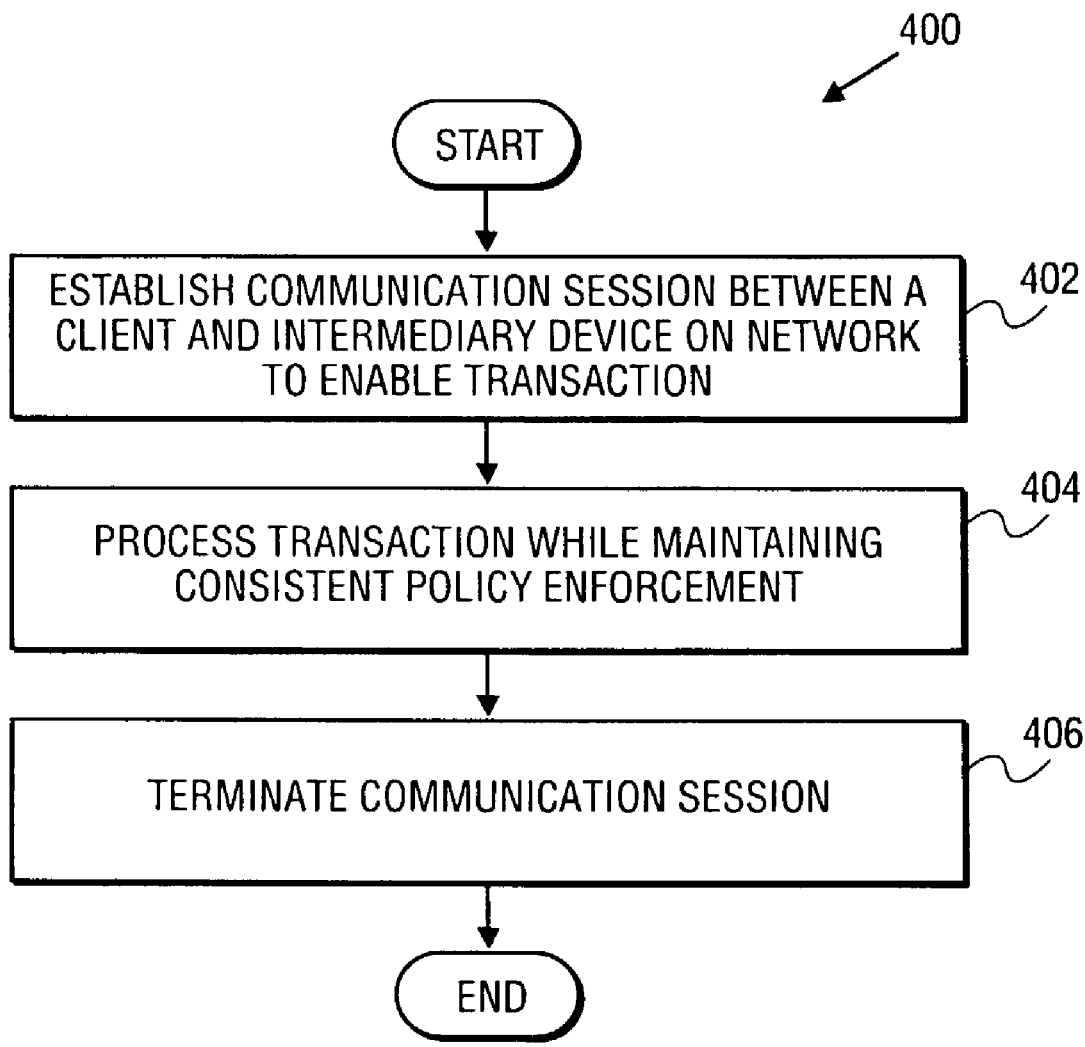
FIG. 4 is a flow diagram of one embodiment of a method for managing policies within a network intermediary device during a communication.

FIG. 4 is a flow diagram of one embodiment of a method 400 for managing policies within a network device during a communication. In one embodiment of the invention, the network device is an intermediary device, such as a web accelerator, however application may be to any kind of device on a network wherein policy is in need of management. Herein, a communication may be, for instance, a connection or a transaction. A connection is a lower network layer request to establish a connection between the client and the network device. A transaction, on the other hand, is an upper network layer request by the client, typically for an object, as well as the associated response to the client request, typically by obtaining and delivering the object to the client. For brevity's sake, unless where necessary to make a distinction, a connection and a transaction will be referred to generally as a communication.

Referring to FIG. 4, method 400 begins, at processing block 402, with establishing a communication session on a network to enable processing of a client request. In one embodiment of the invention, the session is established between a client and an intermediary device on a network to enable processing of a communication between the client and the intermediary device. However, the communication session may be between an intermediary device and a server, another intermediary device, etc. Further details are discussed in further detail in conjunction with FIG. 6 below. Next, method 400 continues, at processing block 404, with processing the communication while maintaining consistent policy rules enforcement. Exemplary embodiments of processing the communication while maintaining consistent policy rules enforcement are described in more detail in conjunction with FIGS. 5, 6 and 7 below. Finally, method 400 concludes, at processing block 406, with terminating the communication session after the processing is completed.

Figure 5:
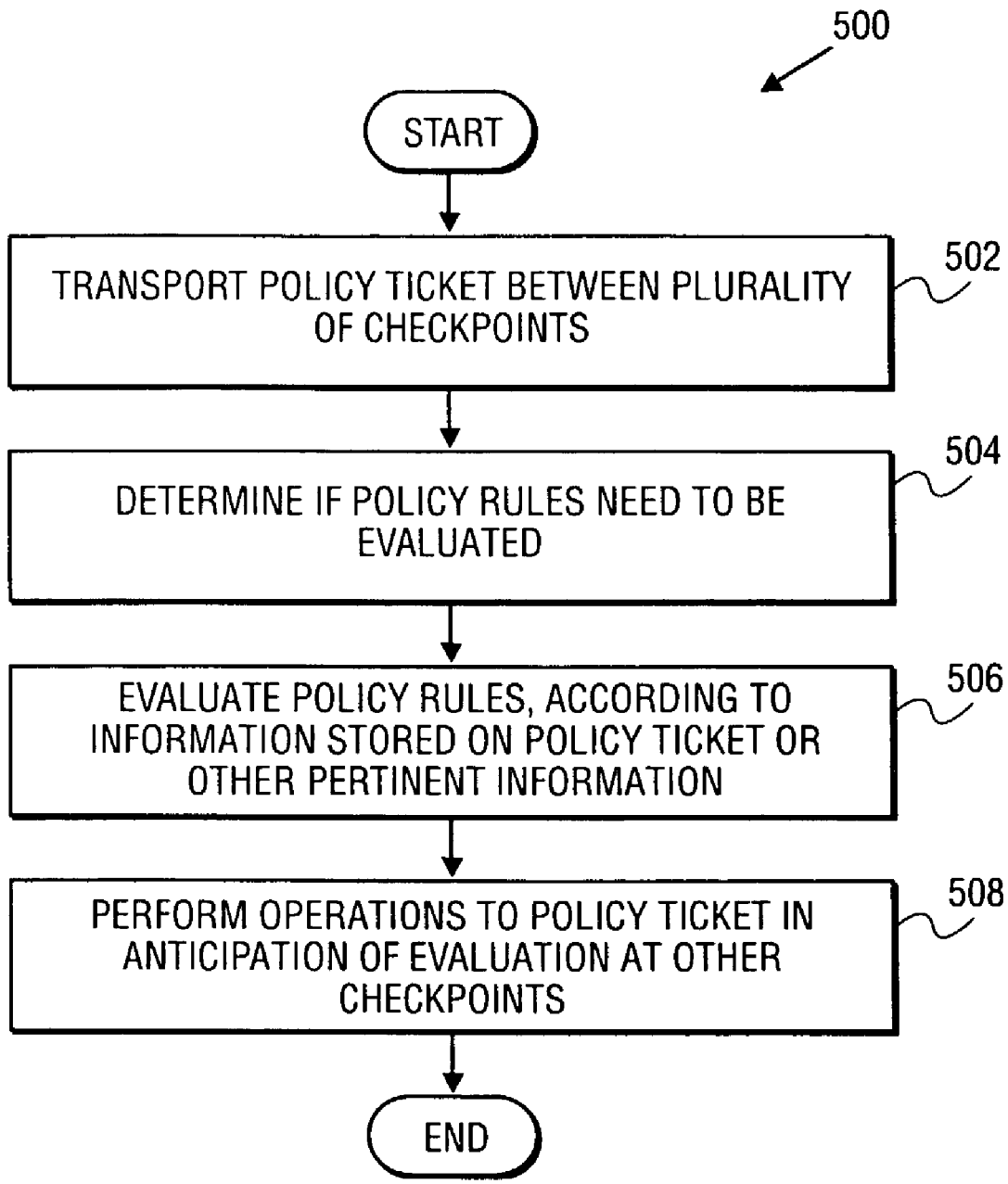
FIG. 5 is an exemplary embodiment of a method of processing a communication while maintaining consistent policy rules enforcement

FIG. 5 is an exemplary embodiment of a method 500 of processing a communication while maintaining consistent policy rules enforcement. Processing the communication may include utilizing a policy ticket that references a version of policy rules current at the beginning of the communication. The policy ticket may possess actions and properties, according to the current version of policy rules. Referring to FIG. 5, method 500 may begin, at processing block 502, with transporting the policy ticket between a plurality of checkpoints defining the flow of the communication. Method 500 may continue, at processing block 504, with determining, at any one of the plurality of checkpoints, if policy rules need to be evaluated. Then, method 500 continues, at processing block 506, with evaluating the policy rules, according to information stored on the policy ticket or other pertinent information available to the intermediary device, to determine appropriate actions to be taken during the communication. Next, method 500 may further continue, at processing block 508, with performing operations to the policy ticket in anticipation of evaluation at other checkpoints. These operations may include executing the appropriate actions, storing on the policy ticket the appropriate actions to be subsequently executed by a transactor, maintaining the evaluation state for the current checkpoint, and marking the policy ticket for future evaluation points, as described in detail in conjunction with FIG. 7 below.

Figure 6:
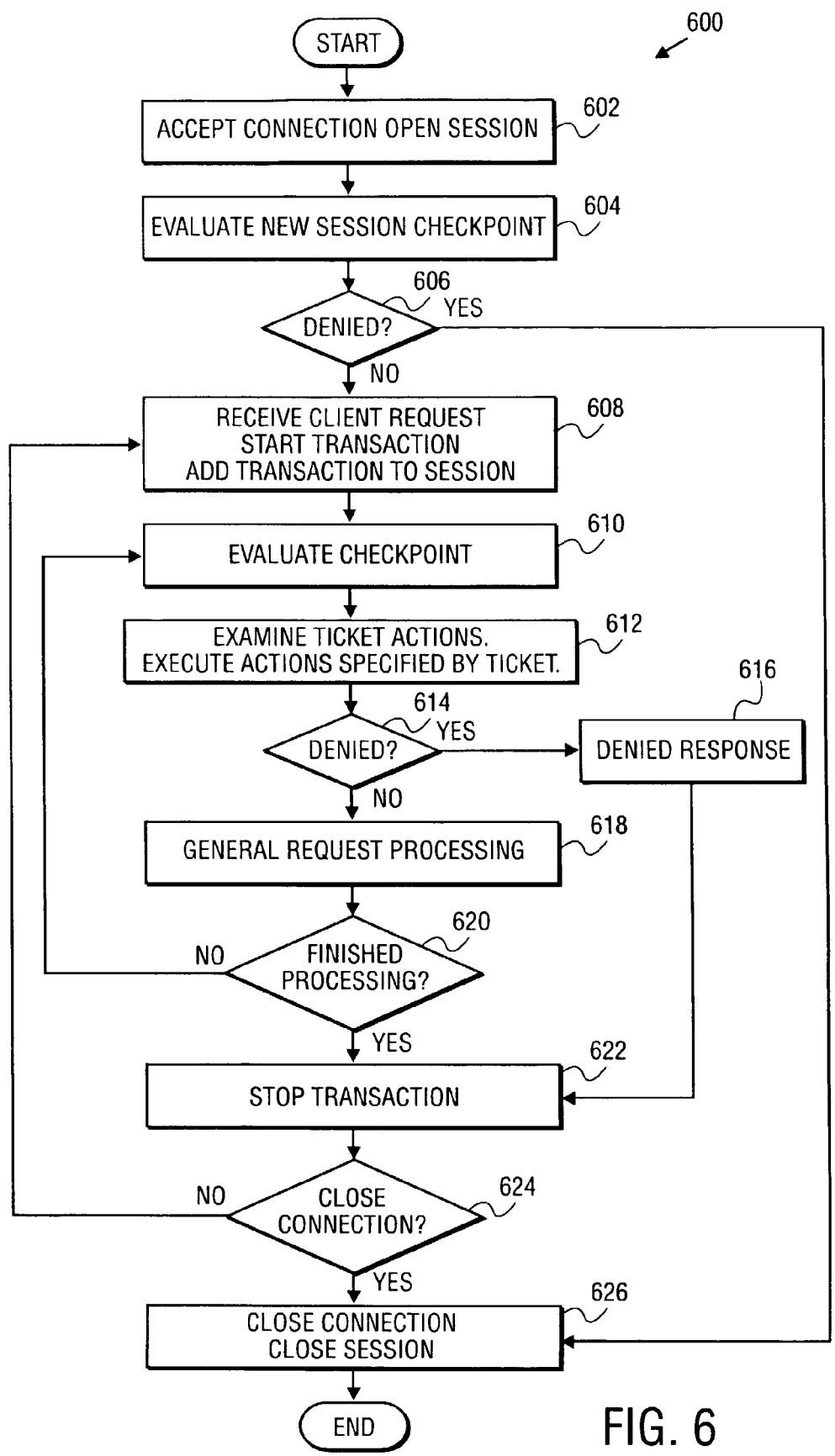
FIG. 6 is a flow diagram of one embodiment of a method for managing policies within a network intermediary device during a client/intermediary transaction.

FIG. 6 is a flow diagram of one embodiment of a method 600 for managing policies within a network intermediary device during a client/intermediary transaction. Referring to FIG. 6, method 600 begins, at processing block 602, with receiving a request from a client to open a network connection between the client and the intermediary device. Next, method 600 continues with opening a session, wherein a transactor opens a session object and communicates with a policy administrator. The policy administrator provides several utilities. First, the policy administrator provides a way to register the session for maintenance of resource quotas. Many of the future policy applications that may need to be supported are in the area of bandwidth management. These are often policies that limit the bandwidth available to a particular connection. Second, the policy administrator provides manual intervention, for instance, if an administrator wants to forcibly shut down particular traffic. Third, the policy administrator allows for notification of policy changes affecting the session.

In this embodiment, a protocol specific transactor (i.e., protocol agent) may be used. A first policy ticket is associated with the session for the duration of the connection. The first policy ticket references a first version of policy having rules relating to network connections.

Next, as shown in processing block 604, a first checkpoint is encountered. In one embodiment, this checkpoint may be referred to as a "New Session" checkpoint. At this point, the protocol agent delivers the first policy ticket to the policy evaluator and the policy evaluator evaluates the checkpoint. An exemplary embodiment of evaluating a checkpoint is described in conjunction with FIG. 7 below. New Session, being the first checkpoint encountered for the first time during the connection, means processing block 604 would necessarily include processing in blocks 702, 706, 708, and 710, thereby initializing the policy ticket.

Next, referring again to FIG. 6, method 600 continues, at decision block 606, with determining if the connection should be granted or denied. If the connection is denied, then the connection and session are closed, as shown at processing block 626. A grant or denial is done by the protocol agent, which determines such by checking the policy ticket for denial actions that may have been written onto the policy ticket according to policy rules as determined at processing block 604.

If the connection is granted, then method 600 continues, at processing block 608, with receiving the client request and starting a transaction. The protocol agent adds the transaction to the session. At this point, a second policy ticket is issued. By using a separate ticket, policy can be maintained for two distinct objects. More specifically, the policy ticket associated with the session may contain policy decisions applying to the single client connection. On the other hand, the policy ticket associated with the transaction may contain policy decisions applying to a specific request, carried over the connection.

Next, at processing block 610, the transaction encounters a checkpoint, and the protocol agent delivers the transaction and the associated policy ticket to the evaluator for checkpoint evaluation. Again, an exemplary embodiment of evaluating a checkpoint is described in conjunction with FIG. 7 below.

After checkpoint evaluation, as shown in processing block 612, the protocol agent examines and executes policy ticket actions that may have been written at processing block 610. Depending on what actions may have been written to the policy ticket, the transaction may experience a variety of processing, which may lead the transaction to certain other checkpoints within the intermediary device, or may even cause denial. Thus, in one embodiment, method 600 may continue, at processing block 614, with determining if the transaction should be denied continuance. If so, then the protocol agent may issue a denial response to the client, as shown at processing block 616, then stop the transaction, as shown at processing block 622.

However, if the transaction is not denied, then method 600 may continue, at processing block 618, with processing the client request. Ticket properties may be consulted during the processing of the request. For instance, the protocol agent may look at decisions rendered at one of the previously evaluated checkpoints, such as a setting for the maximum allowed download size, or whether or not the object should be virus scanned (this decision is often taken at CI based on the location or type of object being requested, but the action must be taken after the object has been retrieved from the server.

Once finished, as shown at decision block 620, the protocol agent determines whether the processing is complete. If not, then the transaction may need to continue to another checkpoint for further evaluation and processing, thus returning to processing block 610. If, however, processing is complete for the transaction, the method 600 continues, at processing block 622, with stopping the transaction. At this point, a reference count of the policy version may be performed. Within the intermediary device, a certain number of transactions may be using a certain version of policy at any given time. In other words, one version of policy may be referenced by more than one ticket. By performing a reference count, the protocol agent makes sure that the version of policy is not eliminated if other transactions are still utilizing it. If no transactions are utilizing the version of policy, then the reference count will be zero. When the reference count for a specific version of policy reaches zero it will be deleted if a more recent version of policy has been installed.

Next, method 600 continues, at decision block 624, with determining if the connection should be closed. For instance, in a hypertext transfer protocol (HTTP) model, certain web browsers follow an early version of http (pre version 1.1) that allows only one transaction per connection. However, later versions of http allow for multiple transactions per connection. On the other hand, in an ftp protocol, the connection would not need to be closed for multiple transactions.

Once all transactions are complete, then method 600 terminates, at processing block 626, with closing the connection and closing the session.

Figure 7:
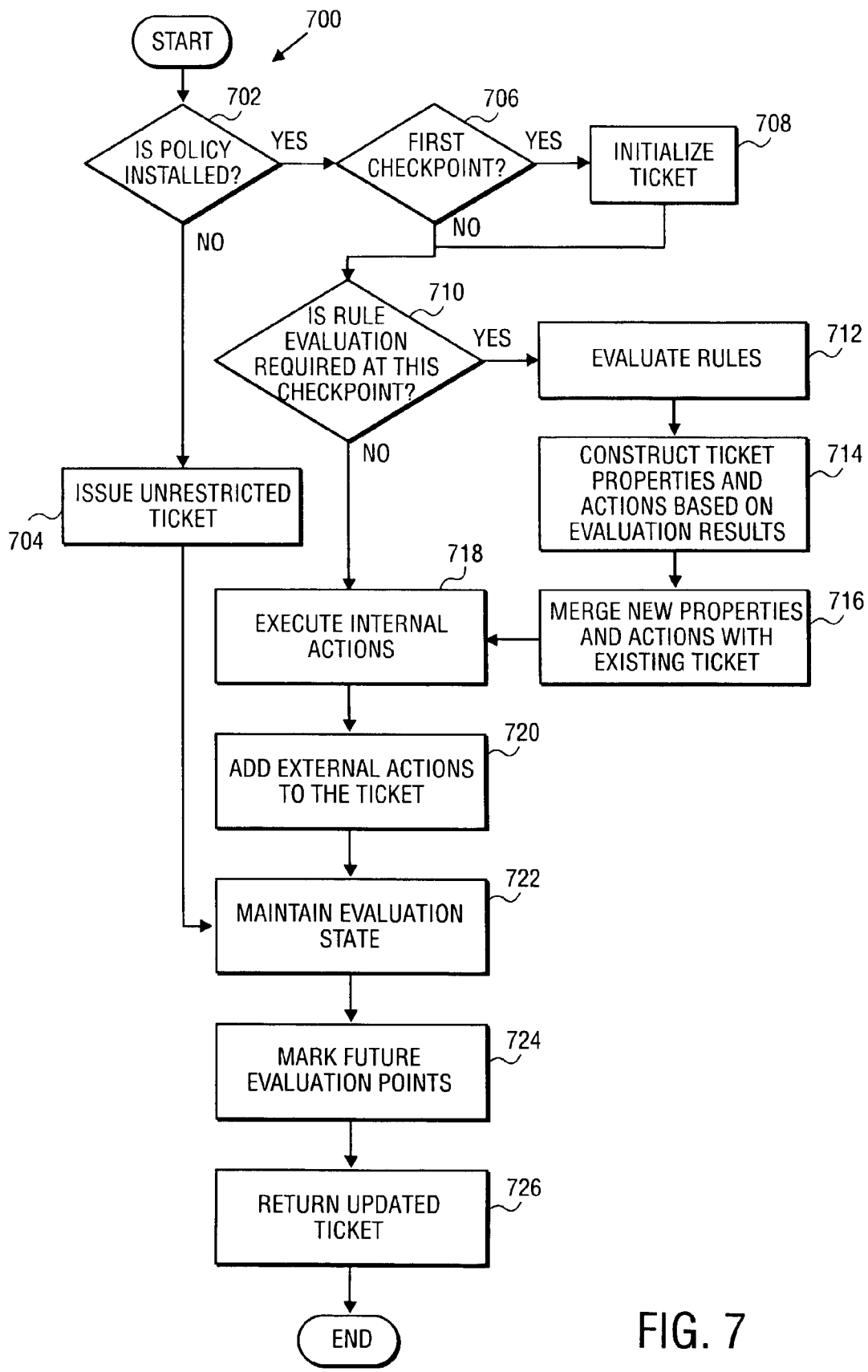
FIG. 7 is a flow diagram of one embodiment of a method for processing a communication between a client and an intermediary while maintaining consistent policy enforcement during the communication.

FIG. 7 is a flow diagram of one embodiment of a method 700 for processing a communication between a client and an intermediary while maintaining consistent policy enforcement during the communication. Method 700 begins, at decision block 702, with the policy evaluator determining if policy has been installed into the intermediary device for the particular communication. Some client requests are not sophisticated and may not have any policy associated with it. For this reason, the policy evaluator may therefore issue an unrestricted ticket, as shown in processing block 704. Issuing an unrestricted ticket means that no actions or properties are written to the policy ticket for that checkpoint, or for any subsequent checkpoints encountered for the communication.

If, however, policy has been installed for the communication, then method 700 continues, at decision block 706, with the policy evaluator determining if the current checkpoint is the first checkpoint encountered for the communication, for the first time. If so, then the ticket is initialized, as shown at processing block 708. Initializing the ticket means the policy evaluator consults the policy administrator to determine the most current version of policy stored on the intermediary device, then store the default values of current policy onto the policy ticket. Thus, the policy ticket has a first set of policy rules that can be referred to throughout the communication.

Next, method 700 continues with the policy evaluator determining if policy rules need to be evaluated at the checkpoint, as shown in decision block 710. For instance, policy may not need to be evaluated if no new information has been received between checkpoints to apply the policy rules to. Policy rules are condition statements, generally in the form of if X then Y. New information received during the client communication relates to the "if X" part of the rules. If no "if X"s occur, then no "then Y"s need to be determined. Furthermore, depending on the client request, or the point in the communication flow, certain checkpoints may not need to evaluate rules. For example certain rules may not need to be evaluated at certain checkpoints, depending on the client request. In another example, rules may have previously been evaluated for that checkpoint and won't need further evaluation if the communication reaches that checkpoint again. Essentially, by determining if policy rules need to be evaluated, the policy evaluator can act as a time and resource saver.

If rules need evaluation, then the policy evaluator evaluates the rules, as shown in processing block 712, then constructs properties and actions to be placed on the ticket based on the evaluation rules, as shown in processing block 714. In other words, the policy evaluates the "if X"s and constructs the "then Y"s.

Next, the policy evaluator merges the newly created properties and actions with existing properties and actions already on the policy ticket, as shown in processing block 716. The policy ticket may have properties and actions on the ticket that were previously created and written onto the ticket at previous checkpoints. When the rules are newly evaluated in the present checkpoint, however, some of the previous properties and actions may conflict with the new properties and actions, and therefore, may need to be replaced. Some previously created properties and actions, however, may not need to be replaced at all since they may not conflict with new properties and actions, but should be left on the ticket since they may be applicable at future checkpoints.

Next, the policy evaluator may execute actions internal to the policy evaluator, as shown in processing block 718. Executing of internal actions implies actions that are not necessarily protocol specific, and therefore may be executed by the policy evaluator as opposed to a protocol specific transactor (i.e., protocol agent).

The policy evaluator may also add actions to be executed external to policy evaluator, onto the policy ticket, as shown in processing block 720, which will later be enacted by a protocol specific transactor once the policy evaluator is finished processing, and delivers the policy ticket to the transactor.

Next, the policy evaluator will maintain the evaluation state for the checkpoint, as shown in processing block 722. Maintaining the evaluation state for the checkpoint includes recording what checkpoint the communication has just encountered, trimming the rule set, or analyzing partial evaluation results. Trimming the rule set includes storing information about the rule set applicable to the transaction. Analyzing partial evaluation results includes determining if some condition in the rules has already been evaluated and saving the results as a performance optimization.

Next, method 700 continues, at processing block 724, with marking the policy ticket for future evaluation points. The policy evaluator marks certain policy rules for future evaluation at subsequent checkpoints. Hence, the process of making the decision at decision block 710 is based on data recorded in processing step 724, if the checkpoint is not the first checkpoint encountered for the first time. For the first checkpoint encountered for the first time, the initializing of the ticket with default values, as performed in processing block 708, replaces the necessary processing performed in block 724 for checkpoints other than the first entered for the first time. For this reason, the initializing of the ticket, block 708, is only done once per communication, but marking of future evaluation points, block 724, may be performed as many times for as many times as checkpoints encountered during communication after the first checkpoint.

Finally, once the policy evaluator is finished processing, method 700 continues, at processing block 726, with delivering the policy ticket to the transactor so that the client request may continue for the communication. Method 700, therefore, assures that the communication will efficiently flow according to a single version of policy, stored on the policy ticket, from checkpoint to checkpoint, until the communication is complete.

Figure 8:
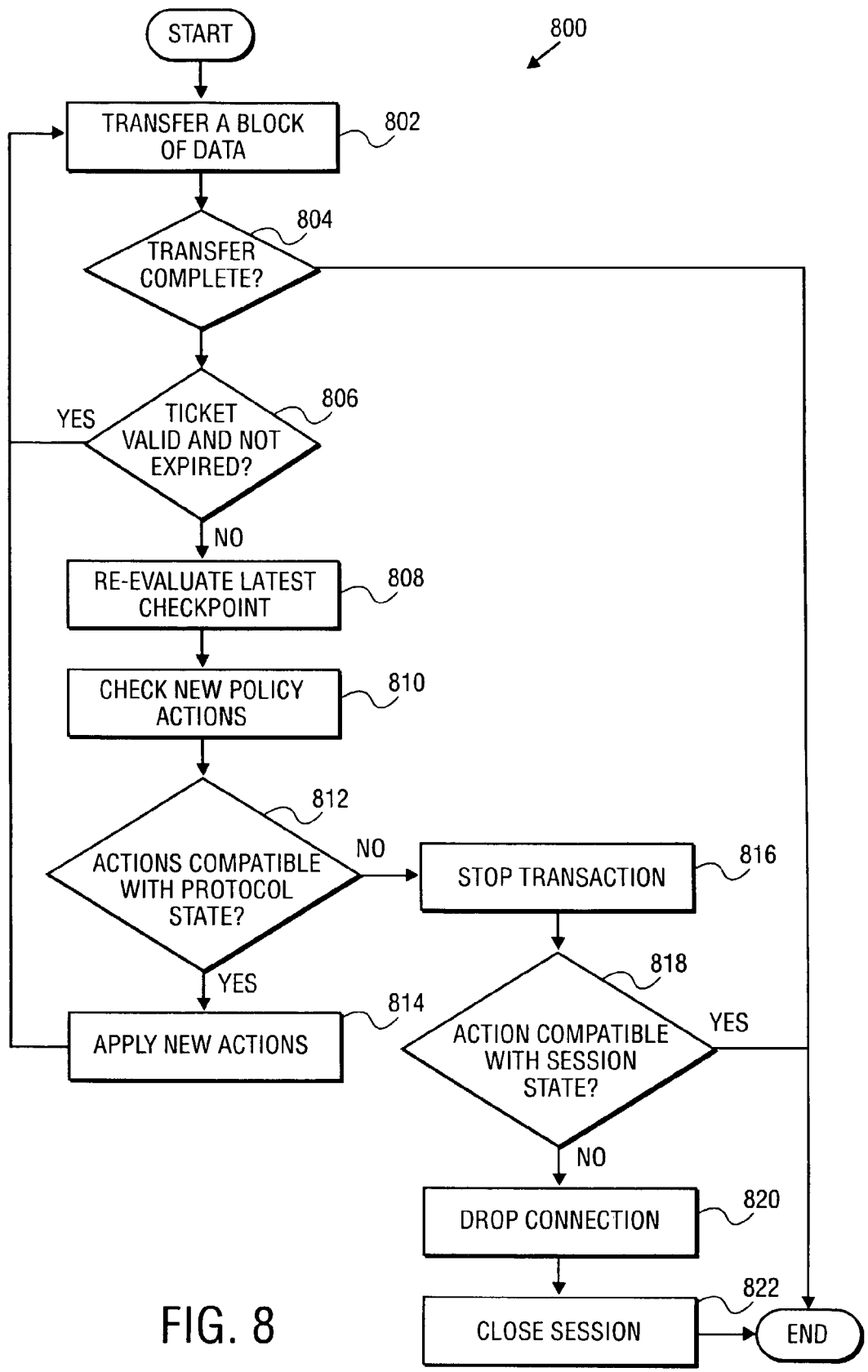
FIG. 8 is an exemplary method for determining the validity of a policy ticket during a data transfer between the intermediary and the client.

FIG. 8 is an exemplary method 800 for determining the validity of a policy ticket during a data transfer between the intermediary and the client. When data is being transferred from the intermediary device to the client, it may be advantageous to expire, or invalidate a policy ticket. Expiry and invalidation may be necessary for extended data transfers between the client and the intermediary that may need reevaluation of policy rules. In one embodiment, the data transfer may occur within a data pump, and may already have encountered the final checkpoint (e.g., Client-Out) for a transaction.

Referring to FIG. 8, method 800 begins, at processing block 802, with transferring a block of data between the intermediary device and the client. Then, the transactor (e.g., protocol agent) determines if the transfer is complete, as shown in decision block 804. The transfer of data may be large, or last for a long time, as in the case of streaming media; therefore, the transactor may be checking intermittently to see if the data transfer has finished yet.

If the data transfer is not complete, the transactor may want to also determine if the version of policy on the latest policy ticket is valid or expired, as shown in decision block 806. For instance, if there has been a new version of policy loaded onto the intermediary device, then the policy ticket may be invalidated. Furthermore, if the data transfer is happening over a long period of time, the policy ticket may simply need to be retired, or expired. For instance, policy rules such as "video streams are only available during lunch" may require that authorization granted through the policy ticket be set to expire. Therefore, if the ticket is neither invalid nor expired, method 800 continues with transferring the next block of data, as shown in processing block 802. However, if ticket is either invalid or expired, then method 800 continues, at processing block 808, with reevaluating the latest checkpoint encountered by the transaction. In most cases, the last checkpoint will either be the Client-Out checkpoint, or the Media-Play checkpoint. An exemplary method of reevaluating the latest checkpoint is described in more detail in conjunction with FIG. 9 below.

Once the transaction has been re-evaluated, the ticket is validated, meaning that policy decisions in the policy ticket reflect the current rules and should be enforced. However, it will contain new actions which may be the same as or completely different from the properties and actions on the invalidated ticket. For example, the validated ticket may now deny the transaction or require that the user associated with the transaction be authenticated, when this was not previously required. These differences could be because of new rules (in the invalidated ticket case), or because a time boundary was crossed (in the ticket expiry case). Hence, those new actions will need to be checked, as shown at processing block 810.

Once the new actions are checked, method 800 continues, at processing block 812, with determining if the new actions are compatible with protocol state. Normally, the rules enforced by the policy compiler prevent incompatible actions from being applied to a request. In this case, since either a new version of policy has been applied, or the existing policy has caused a previous decision to expire, there must be an additional check to ensure that new actions are not being attached to the ticket at an inappropriate time, when they cannot be properly enforced.

For example, a transaction under one version of policy version may not have required authentication. If policy changes, however, to now require authentication for the transaction while the transaction is in progress, and the ticket is re-evaluated while delivering data to the client after the Client-Out checkpoint, an authenticate action will be attached to the ticket. However, because of the definition of the protocol being used, the authentication challenge must be presented to the client prior to the Client-In-Authorize checkpoint—unless the client pro-actively offered credentials—and there would be no way to get them, thus no way to authenticate the user. Therefore, in such a scenario, the timing of the actions is off and policy would dictate that the transaction be stopped. If the credentials were by chance present, however, then the user could be authenticated, and, if successful, the method could continue.

If the new policy actions are compatible with the protocol state, then the new actions are applied, and the next block of data may be transferred, as shown in processing blocks 814, and 802. If, however, the policy actions are not compatible with the protocol state, the transaction is stopped, at processing block 816, and the actions must be determined as compatible with the session state. For example, sessions can have such things as security contexts associated with them, such as Secure Sockets Layers. The transaction policy ticket may thus indicate session security requirements contrary to the security contexts. If the session can't meet the requirements of the transactions arriving on it, the connection and session may need to be closed, as shown in processing blocks 820 and 822, respectively, and the client would need to establish a new connection, which would establish a new policy session. If the new policy is compatible with session state, however, then there can be new requests accepted over the connection, and processing continues.

Figure 9:
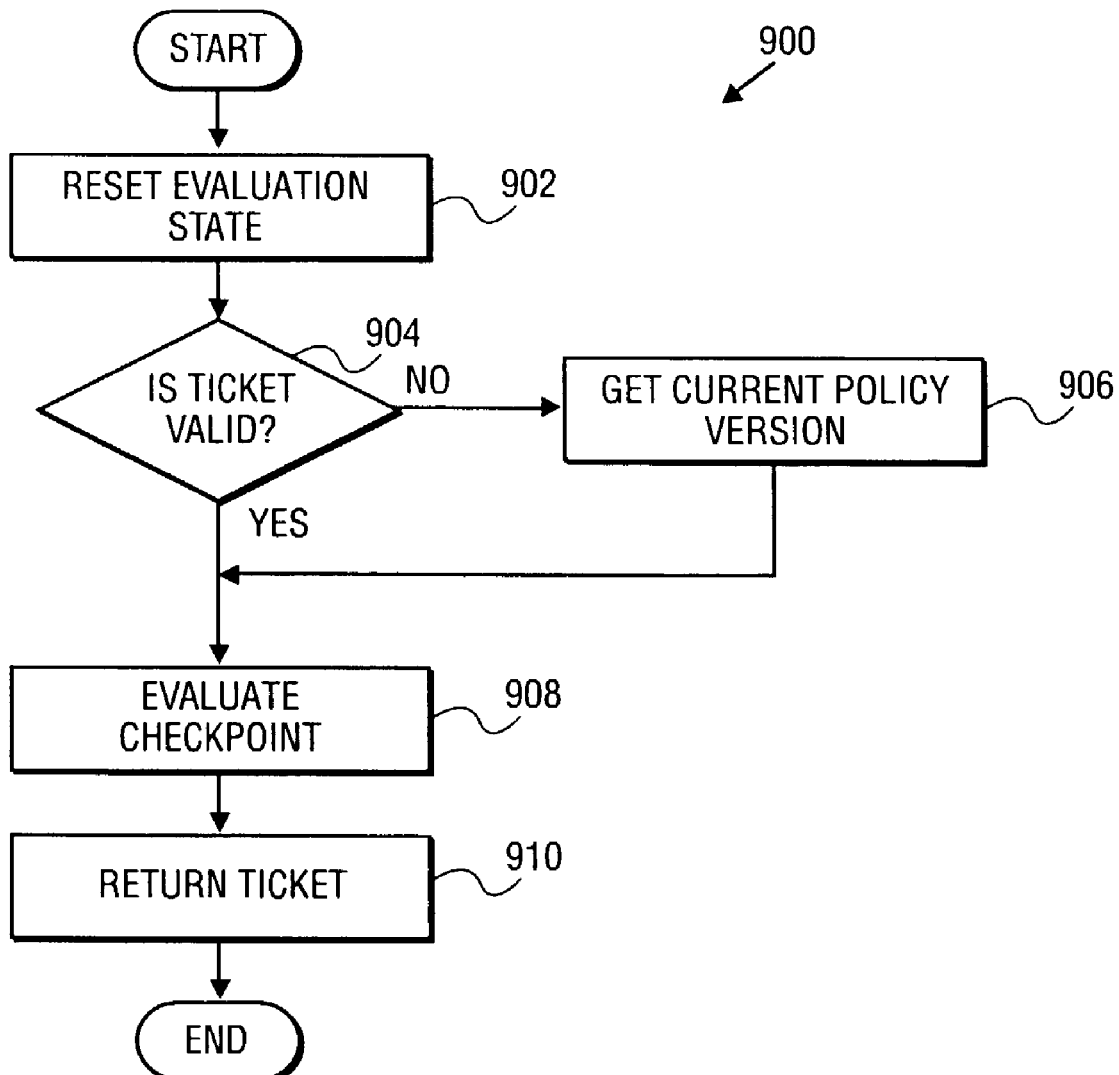
FIG. 9 is an exemplary method of reevaluating a checkpoint during a data transfer in a communication.

FIG. 9 is an exemplary method 900 of reevaluating a checkpoint during a data transfer in a communication. Method 900 begins, at processing block 902, with resetting the evaluation state. This may include resetting the state of processing as described in FIG. 7, processing blocks 722 & 724, including clearing partial condition evaluation results, rule set trimmings, the latest checkpoint successfully evaluated, and future evaluation points markings. Next, method 900 continues, at decision block 904, with determining if the policy ticket is valid, as opposed to expired. If found invalid, then the latest version of policy is retrieved from the policy administrator and the ticket is updated with a current version of policy, as shown in processing block 906. Then, the checkpoint may be evaluated with the new version of policy, as shown in processing block 908. Checkpoint evaluation may follow the same methodology as described in conjunction with FIG. 7 above. Finally, method 900 concludes with returning the new policy ticket to the transactor so that new policy actions can be checked.

Object Model

Figure 10A:
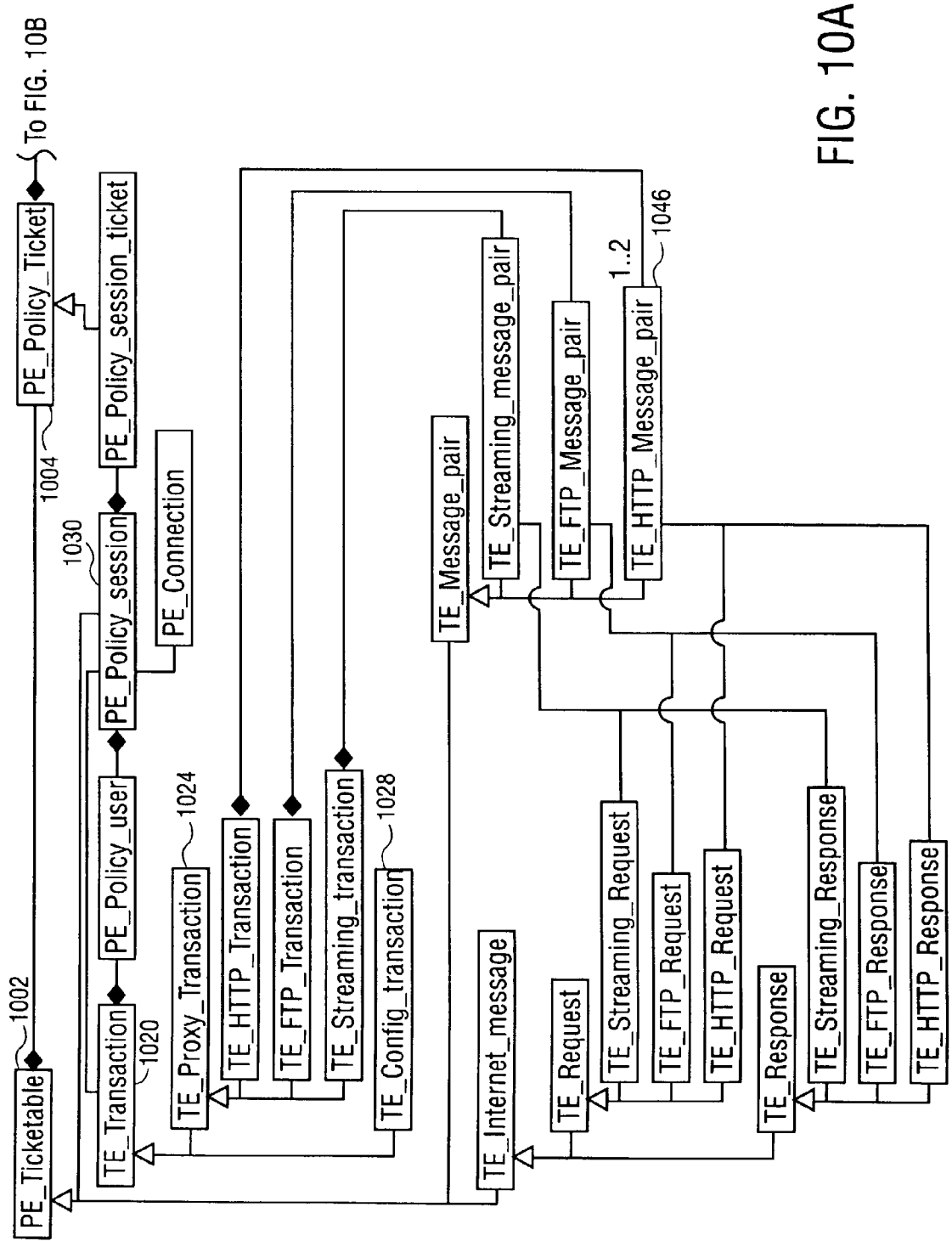
FIG. 10 is a high-level block diagram of an object model of one embodiment of the invention.
Figure 10B:
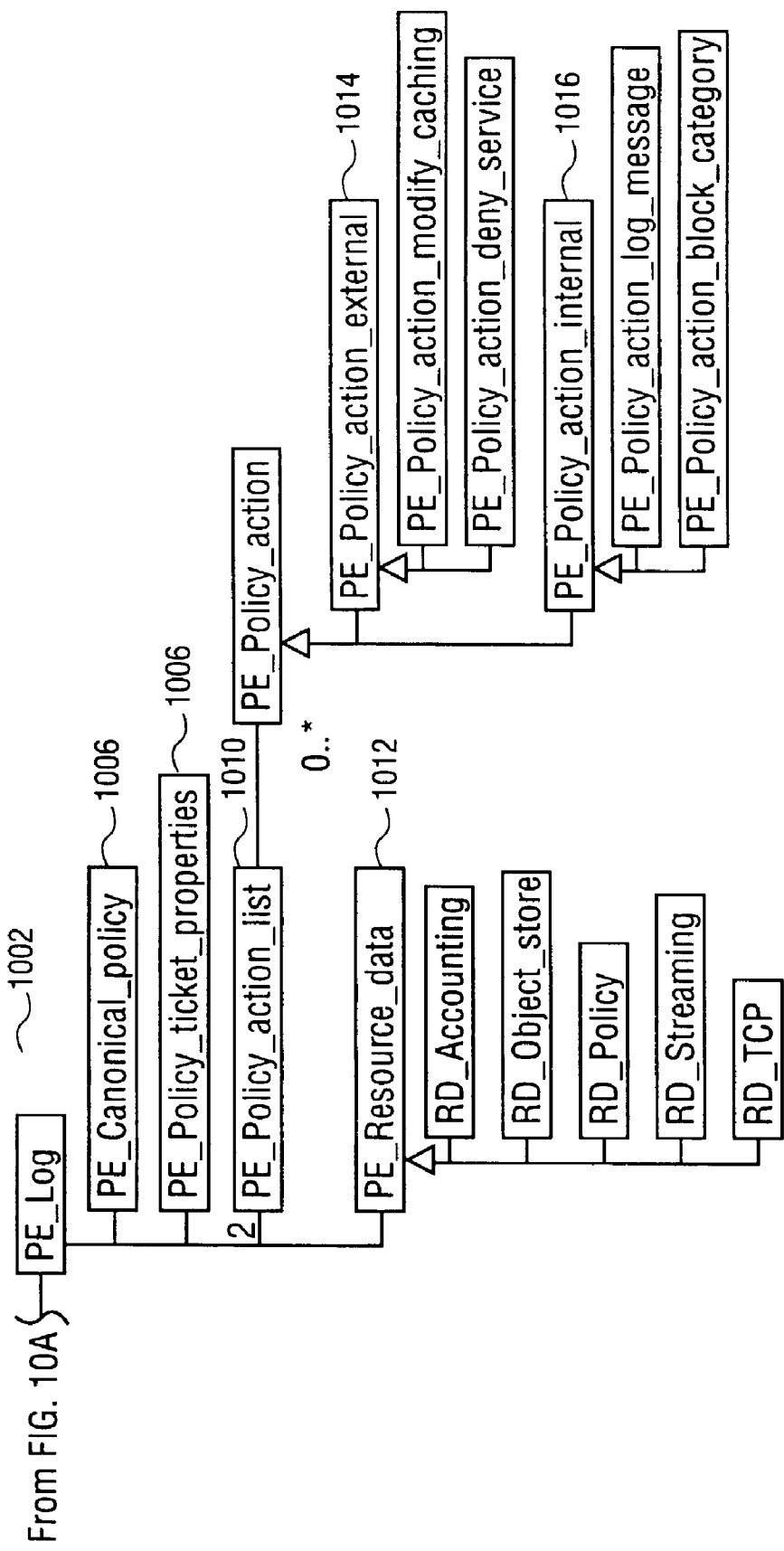

FIG. 10 is a high-level block diagram of an object model 1000 of one embodiment of the invention. Model 1000 is not intended to represent a complete list of transaction types, or actions, but merely indicates exemplary transaction types, and actions, to illustrate an object structure according to one embodiment of the invention. Model 1000 demonstrates interaction between components of a policy ticket 1004, such as a version of canonical policy 1006, properties 1008, action lists 1010, and resource data 1012. Model 1000 further demonstrates how a variety of objects are ticketable 1002, including sessions 1030 and transactions 1020. Ticketable objects are objects that have access to policy decisions that have been made and which can therefore take policy directed actions. Furthermore, model 1000 demonstrates that protocol specific transactions 1022 are only one type of transaction. Transactions could also be administrative transactions 1028, which are transactions that apply policy for managing the intermediary device.

In addition, model 1000 also demonstrates how a protocol specific transaction, such as an http transaction 1024 has two distinct message pairs 1046—1) a client-side message pair and 2) a server-side message pair—which are related throughout a protocol specific transaction. For an http transaction, the transaction may need to be split up into two separate connections—the first is a connection between the client and the intermediary device, the second from the intermediary device to an origin content server (OCS). An OCS holds content (i.e., objects) that are not available in the intermediary device. Thus, within the client-side and server-side message pairs, are four messages: (1) the client request to the intermediary device, (2) the intermediary device's request to the server, (3) the server's response to the intermediary device, and (4) the intermediary device's response to the client. An advantage of model 1000, therefore, is that since one policy ticket 1004 applies to a single transaction that includes the two message pairs (the four messages), a single version of policy applies to both server-side and client-side messages.

In addition, model 1000 demonstrates that associated with the policy ticket 1004, there are two lists of policy actions 1010, a list of external actions 1014, and a list of internal actions 1016.

COMPUTER ARCHITECTURE

Figure 11:
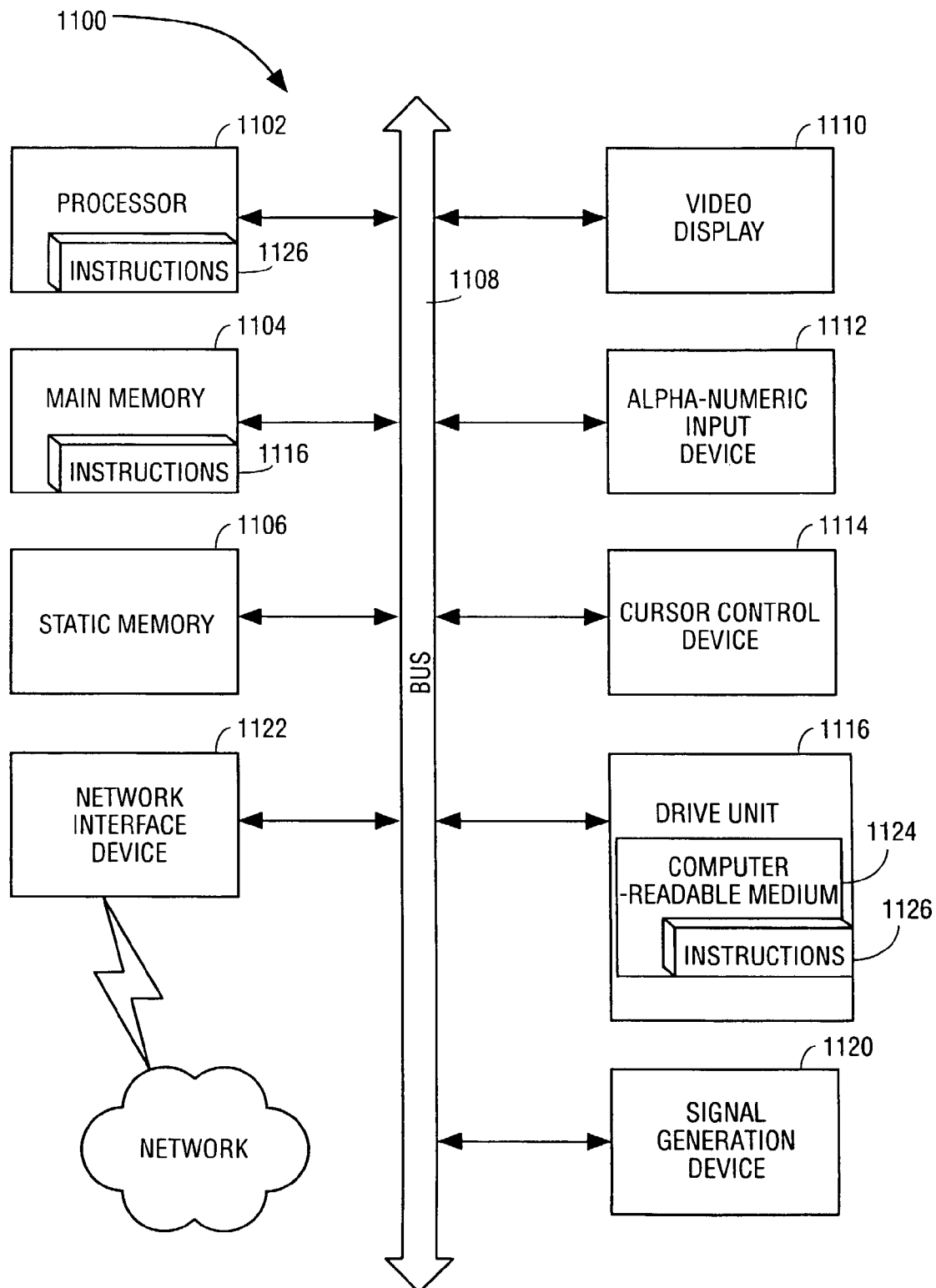
FIG. 11 shows a diagrammatic representation of machine in the exemplary form of a computer system within which a set of instructions, for causing the machine to perform any one of the methodologies discussed above, may be executed.

FIG. 11 shows a diagrammatic representation of machine in the exemplary form of a computer system 1100 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also may include an alphanumeric input device 1112 (e.g., a keyboard), a cursor control device 1114 (e.g., a mouse), a disk drive unit 1116, a signal generation device 1120 (e.g., a speaker) and a network interface device 1122.

The disk drive unit 1116 includes a computer-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for policy management has been described. The scope of the present invention should only be measured by the claims, which follow.

What is claimed:

1. A method, comprising:

in response to receipt of a request from a client to open a connection between the client and a network device at which the request is received, a transactor of the network device opening a session for the connection and adding one or more transactions to the session, each of said transactions for accumulating information during processing of the connection;

associating, at the network device, a first policy ticket with the session for the duration of the connection, the first policy ticket including a first version of policy rules relating to processing of network connections that can be referred to throughout the processing of the connection, and, upon encountering a first communication flow checkpoint in processing of the connection, determining, by consulting the first policy ticket, whether the connection should be granted or denied;

if the connection is denied, then closing the session and the connection; otherwise if the connection is granted, then:

issuing one or more second policy tickets, each associated with a respective one of the transactions, the second policy tickets each containing policy rules applicable to respective ones of the transactions;

at the network device, responding to the request by evaluating each of the transactions and die respective second policy tickets at one or more communication protocol-defined checkpoints and, following evaluation at each respective checkpoint, the transactor examining and executing actions written onto the respective one of the second policy tickets so that, depending on said actions, each respective transaction is subsequently processed at zero or more further ones of the checkpoints according to respective evaluations of the respective transaction and respective second policy ticket properties, including decisions rendered at previously evaluated ones of the checkpoints, until such time as the respective evaluations determine either that (i) die respective transaction should be denied continuance, and, if so, the transactor issuing a denial response to the client; or (ii) the respective transaction processing is complete;

as each subject transaction finishes its respective processing, determining whether policy rules applicable to the subject transaction have been superseded by more current versions thereof and, if so, replacing the applicable policy rules with the more current versions thereof; and closing the connection and the session once all transactions associated with the connection are complete.

2. The method of claim 1, wherein as each second policy ticket is evaluated at the checkpoints and according to determinations, at any of the checkpoints, of actions to be taken during a communication, updating the respective second policy ticket properties.

3. The method of claim 2, wherein determinations of actions to be taken during the communication comprise evaluations of policy rules according to information accumulated in the transactions.

4. The method of claim 3, further comprising performing operations to each respective second policy ticket in anticipation of evaluation at the checkpoints.

5. The method of claim 4, wherein performing operations in anticipation of evaluation at the checkpoints includes executing the actions.

6. The method of claim 4, wherein performing operations in anticipation of evaluation at the checkpoints includes storing on each respective second policy ticket the actions to be subsequently executed by the transactor.

7. The method of claim 4, wherein performing operations in anticipation of evaluation at the checkpoints includes maintaining evaluation states for the checkpoints.

8. The method of claim 4, wherein performing operations in anticipation of evaluation at the checkpoints includes marking each respective second policy ticket for future checkpoints.

9. The method of claim 1, wherein evaluating each of the transactions and each respective second policy ticket at one or more checkpoints comprises:

delivering the respective second policy ticket and the respective transaction to a policy evaluator when the respective transaction encounters a subject one of the checkpoints;

determining, at the subject one of the checkpoints, if policy exists regarding the communication;

if no policy exists, then:

a. allowing the respective transaction to continue unrestricted; otherwise, if policy exists, then:

b. determining if the subject checkpoint is a first checkpoint encountered for the respective transaction for a first time, and, if so, initializing the respective second policy ticket with a most current version of policy:

determining if policy rules need to be evaluated at the subject checkpoint;

if policy miles need to be evaluated, then:

a. evaluating the policy rules;

b. constructing properties and actions to be placed on the respective second policy ticket based on the evaluation of the policy rules; and c. merging the properties and actions with existing properties and actions on the respective second policy ticket.

10. The method of claim 9, wherein merging the properties and actions with existing properties and actions on the respective second policy ticket comprises:

adding actions external to the network device onto the respective second policy ticket;

maintaining an evaluation state for the subject checkpoint; and marking the respective second policy ticket for future evaluation points.

11. The method of claim 1, further comprising:

transferring data to the client after encountering a final checkpoint.

* * * * *